United States Patent
Rosi et al.

(10) Patent No.: US 11,560,029 B2
(45) Date of Patent: Jan. 24, 2023

(54) SYSTEM FOR CHECKING THE PRESENCE OF THICKNESS RESTRICTIONS ON AT LEAST ONE MECHANICAL COMPONENT AND METHOD FOR CHECKING THEM

(71) Applicant: TIBERINA SOLUTIONS S.R.L., Umbertide (IT)

(72) Inventors: Ricky Massimiliano Rosi, Umbertide (IT); Luigi Berri, Umbertide (IT)

(73) Assignee: TIBERINA SOLUTIONS S.R.L., Umbertide PG (IT)

( * ) Notice: Subject to any disclaimer, the term of this patent is extended or adjusted under 35 U.S.C. 154(b) by 390 days.

(21) Appl. No.: 16/793,091

(22) Filed: Feb. 18, 2020

(65) Prior Publication Data

US 2020/0264306 A1    Aug. 20, 2020

(30) Foreign Application Priority Data

Feb. 18, 2019    (IT) .................. 102019000002335

(51) Int. Cl.
    *G01B 5/20*    (2006.01)
    *B60G 7/00*    (2006.01)
    (Continued)

(52) U.S. Cl.
    CPC .......... *B60G 7/001* (2013.01); *B25J 15/0066* (2013.01); *G01B 5/20* (2013.01); *G01B 11/24* (2013.01);
    (Continued)

(58) Field of Classification Search
    CPC ........... G01B 5/20; G01B 11/24; G01B 17/02
    (Continued)

(56) References Cited

U.S. PATENT DOCUMENTS

| 9,927,230 B2 | 3/2018 | Schiffmann et al. |
| 2013/0167647 A1* | 7/2013 | Bailey .................. G01N 29/22 73/632 |

(Continued)

FOREIGN PATENT DOCUMENTS

| CN | 104764422 | 7/2015 |
| CN | 108 827 198 | 11/2018 |

(Continued)

OTHER PUBLICATIONS

Priority Search Report and written opinion issued by the Italian patent Office for Italian Priority application No. IT 201900002335.

*Primary Examiner* — George B Bennett
(74) *Attorney, Agent, or Firm* — Silvia Salvadori (57) ABSTRACT

System (100) for checking the presence of thickness restrictions on at least one mechanical component (1), comprising at least one base (2) for fixing said mechanical component (1) coming from a production line (200) to a plurality of fixing points (L1, L2, L3), and measuring means (3) to measure the thickness of said mechanical component (1) next to at least one control point (P) of said mechanical component (1) to be checked, characterized in that said measuring means (3) comprise at least one mechanical robotic arm (30) adapted to be moved in the direction of said at least one control point (P), wherein said mechanical robotic arm comprises at least one ultrasonic probe (31) for the ultrasonic measurement of the thickness of said mechanical component (1) next to said at least one control point (P), said ultrasonic probe (31) being positionable in the proximity of said at least one control point (P) so that the ultrasonic wave emitted by said ultrasonic probe (31) travels along a direction (Q) substantially orthogonal to the plane (T) tangent to the surface (S) of said mechanical component (1) next to said at least one control point (P) to be checked.

14 Claims, 6 Drawing Sheets

(51) Int. Cl.
 *G01B 11/24* (2006.01)
 *G01B 17/02* (2006.01)
 *B25J 15/00* (2006.01)

(52) U.S. Cl.
 CPC .......... *G01B 17/02* (2013.01); *B60G 2206/80* (2013.01)

(58) Field of Classification Search
 USPC .......................................................... 33/503
 See application file for complete search history.

(56) References Cited

U.S. PATENT DOCUMENTS

| | | | |
|---|---|---|---|
| 2015/0362305 A1* | 12/2015 | Ferrari | G01D 5/34 33/503 |
| 2020/0064127 A1* | 2/2020 | Hinduja | G01C 3/08 |
| 2020/0173936 A1* | 6/2020 | Vöhringer | G01B 17/02 |
| 2021/0072166 A1* | 3/2021 | Uher | G01N 23/046 |
| 2022/0057194 A1* | 2/2022 | Zhang | G01B 11/245 |

FOREIGN PATENT DOCUMENTS

| | | |
|---|---|---|
| WO | 2016051147 | 4/2016 |
| WO | 2019004341 | 1/2019 |

* cited by examiner

SYSTEM FOR CHECKING THE PRESENCE OF THICKNESS RESTRICTIONS ON AT LEAST ONE MECHANICAL COMPONENT AND METHOD FOR CHECKING THEM

This application claims priority to and the benefit of Italian Application No. 102019000002335 filed on Feb. 18, 2019, the content of which is incorporated herein by reference in its entirety.

FIELD OF THE INVENTION

The present invention concerns a system for checking the presence of thickness restrictions on at least one mechanical component obtained by molding and the method for checking them. In particular, such mechanical component can be a suspension arm of a car. Although the method and the respective system for checking the thickness of a mechanical component herein and hereinafter refers to the checking of such a component for cars, any component obtainable by molding, and wherein there are rather significant deep-drawings such as to cause possible significant thickness restrictions at a point of the mechanical component to be checked, could be subjected to such method and to the respective system, without thereby departing from the scope of this invention.

KNOWN PRIOR ART

It is known that the mechanical components obtained by molding are checked on sample basis along the production line. For example, before being subjected to further treatments immediately after having been molded, a suspension arm is removed from the production line and subjected to a series of quality checks so that to understand whether or not it is compliant with the design in terms of size and whether or not it has the desired mechanical characteristics for that specific component.

In order to check the dimensional characteristics, the mechanical component is generally fixed to a base and then subjected to the appropriate checks through appropriate measuring means such as, for example, a calibrated mechanical touch-probe or the like. In particular, the operator measures, at some previously identified points, whether or not the thickness of the component is within the range of the tolerance values predefined during the design at those points. Such operation is clearly burdensome both in terms of time and precision.

Whenever this should not occur, the component subjected to measuring, as well as the whole batch produced therewith, would be subjected to further investigations and would be discarded following a confirmation of the results obtained. Moreover, such operation is even more difficult when carried out at control points of the mechanical component that are not positioned in planar regions, but rather in regions that also have significant curvature. Unfortunately, in the case of components obtained by mechanical molding, the zones at greater risk of possible dimensional and functional non-conformities with respect to the design are in fact at the areas with significant curvatures, i.e. areas which are also subjected to an important deep-drawing process. However, such checking method is not without drawbacks. In fact, it fully depends on the skills and experience of the operator carrying out such operation, thus, the check can be incorrect or can produce unreliable results, regardless of how scrupulously it was carried out. Clearly, however, it can imply serious problems for the mechanical resistance of the component checked and, consequently, for the safety of the people using the vehicle in which the mechanical component is mounted, whenever the latter is, like in the example specified above, the suspension arm of a car. In such cases, the car manufacturer of the vehicle in which the component subjected to checking is mounted is forced the recall the numerous vehicles already on the market that mount the suspension arms of the defective batch. It is easy to imagine the subsequences of such an operation, without mentioning the risk linked to the safety of the passengers of the vehicles recalled.

The document WO2019/004341, in the name of Univ Tokyo, describes an ultrasonic measuring device able to measure the thickness of a portion of a mechanical element, by pressing the measuring surface of an ultrasonic probe against a surface of the portion whose thickness must be measured and by transmitting and receiving ultrasonic waves to and from the portion to be measured. The ultrasonic device for measuring the thickness is provided with a supporting portion arranged on the opposite side of the ultrasonic probe with respect to the side of its measuring surface, with a deformable connecting portion for connecting the supporting portion to the ultrasonic probe and with a guiding portion used to position the ultrasonic probe in an initial position and which limits part of the movement of the ultrasonic probe in the radial direction of the probe itself.

The document WO2016051147, in the name of RENISHAW PLC, describes an ultrasonic device that is mounted on equipment for determining the space coordinates of the equipment itself.

The document U.S. Pat. No. 9,927,230, in the name of GIESECKE & DEVRIENT GMBH, describes a method for detecting the circulation appropriateness of a value document (i.e. a banknote) and which comprises the steps of: a) measuring the thickness on a tactile structure of the value document and b) comparing the measured thickness with a previously known target thickness of the tactile structure so that to establish the circulation appropriateness.

The document CN108827198, in the name of YONGCHUN XINDE ENVIRONMENTAL PROTECTION TECH CO LTD, describes ultrasonic equipment for measuring the thickness of a body with high measuring precision.

The document CN104764422, in the name of ZHENJIANG TONZHOU PROPELLER CO, describes a telescopic ultrasonic thickness measuring device for a large spiral propeller.

Object of the present invention is to achieve a checking system which allows to measure the thickness of a mechanical component in selected areas/points in an extremely rapid manner without any possibility of errors.

Thus, object of the present invention is also to achieve a checking method which also allows to measure non-planar surfaces of the mechanical component.

SUMMARY OF THE INVENTION

These and other objects are achieved by a system according to claim 1 of the present invention.

Clearly, such solution allows to solve the problems of the known art mentioned above. In fact, thanks to the system object of the invention, the checking of the thickness of the mechanical component can be carried out automatically and at any control point selected, especially in proximity of the areas or surfaces with significant curvature, thus strongly deep-drawn, without risking that such measures can be carried out in an incorrect manner. Moreover, the innovative and automated system positions itself within the production steps of the components, so that to allow, in the event of deviations, any interventions on a limited number of details with respect to the entire production batch, with significant economic savings and qualitative increases for the products made. Moreover, the exact positioning of the probe, so that it can emit an ultrasonic wave whose direction is substantially orthogonal to the plane tangent to the surface of the mechanical component, at the control point, occurs digitally, by using the three-dimensional solid model of the same mechanical component to be analyzed, or the three-dimensional solid model of the design. This allows to solve the problems of the known art and, thus, to achieve the objects suggested.

Moreover, said robotic arm further comprises spraying means to spray, in the proximity of the control point, a liquid for the diffusion of the ultrasonic wave emitted by said ultrasonic probe.

Moreover, said liquid for the diffusion of said ultrasonic wave comprises glycerin. Finally, said processor is integrated into said mechanical robotic arm.

Always according to the invention, said robotic arm comprises at least one mechanical touch-probe able to detect the space coordinates of the generic control point of said mechanical component touched by said touch probe, wherein said mechanical touch-probe follows a trajectory, preferably in a spiral, in the space surrounding said at least one control point to detect the three-dimensional surface of said surrounding space, and wherein said three-dimensional surface of said surrounding space is compared to the surface of said solid model at said digital control point, so as to locate the exact space coordinates of said control point.

This way, the exact position of the control point on the mechanical component being examined is checked.

The invention achieves the objects suggested above also by means of a method for checking the presence of thickness restrictions on at least one mechanical component obtained by molding, the method comprising the steps of:
a) picking up said mechanical component from the production line;
b) fixing said mechanical component to a base in a plurality of fixing points;
c) measuring the thickness of said mechanical component next to at least one control point of said mechanical component to be checked;
wherein said step c) comprises the step of c1) moving at least one mechanical robotic arm in the direction of said at least one control point, wherein said mechanical robotic arm comprises at least one ultrasonic probe for measuring the thickness of said mechanical component next to said at least one control point, and the step of c2) positioning said ultrasonic probe in the proximity of said at least one control point so that the ultrasonic wave emitted by said probe travels along a direction substantially orthogonal to the plane tangent to the surface of said mechanical component next to said at least one point to be checked, and the step of c3) detecting the thickness of said at least one mechanical component at said control point. Advantageously, said method comprises the step of d1) prearranging the three-dimensional solid model of said mechanical component, the step of d2) using, as three-dimensional references for said three-dimensional solid model, the space coordinates of said plurality of fixing points so that said control point of said mechanical component coincides with a predefined digital control point of said three-dimensional solid model, the step of d3) calculating the plane tangent to the surface of said three-dimensional solid model of said mechanical component next to said digital control point, the step of d4) calculating the direction orthogonal to said plane tangent to the surface of said three-dimensional solid model of said mechanical component, at said digital control point, said step c2) being carried out by said mechanical arm on the basis of the information obtained during said steps d1) to d4) so that said direction substantially orthogonal to said plane tangent to the surface of said mechanical component, next to said at least one control point, coincides with said direction orthogonal to said plane tangent to the surface of said three-dimensional solid model of said mechanical component, at said digital control point on said three-dimensional solid model.

By applying such innovative and automated system, the rapidity of the check allows to install such check directly within the production steps of the components, so that to allow, in the event of deviations, any interventions on a limited number of mechanical details with respect to the entire production batch, with significant economic savings and qualitative increases for the products made. It is thus clear that the method object of the invention allows to solve the problems of the known art mentioned above. In fact, thanks to such system, the checking of the thickness of the mechanical component can be carried out at any control point selected, especially in the proximity of the areas or surfaces with significant curvature, thus strongly deep-drawn, without risking that such measures can be carried out in an incorrect manner. In fact, in the proximity of the control point, the robotic arm is able to position the ultrasonic probe perfectly orthogonal to the plane tangent to the surface of the mechanical component at the control point to be checked. This way, the ultrasonic probe will be able to precisely measure the thickness of the cross-section of the mechanical component at the control point selected, regardless of the curvature of the surface of the mechanical component in which the control point is located.

Advantageously, said three-dimensional solid model is generated by a three-dimensional laser device for digital scans or is made in the design step of the mechanical component. Before being fixed to the base, the mechanical component picked up from the production line is subjected to digital scan so that to have the exact solid model of the component to be checked instead of having the three-dimensional solid model of the mechanical component according to the design.

Moreover, if said robotic arm further comprises spraying means to spray a liquid for the diffusion of the ultrasonic wave emitted by said ultrasonic probe, said method then comprises the step of c4) spraying said liquid at said control point of said mechanical component during at least said step c3) of the method.

Always according to the invention, whenever said robotic arm comprises a mechanical touch-probe able to detect the space coordinates of the generic point of said mechanical component touched by said touch probe, said step c1) comprises the step of c1') causing said mechanical touch probe to follow a trajectory in the space surrounding said at least one control point to detect the three-dimensional surface of said surrounding space, the step of c1") comparing said three-dimensional surface of said surrounding space detected by said mechanical touch probe to the surface of said solid model at said digital control point, and the step of c1''') locating the exact space coordinates of said control point. Such part of the method is extremely important since it allows to check the exact correspondence between the control point where it is desirable to measure and the digital control point present on the three-dimensional model (both in case of the three-dimensional model obtained by means of the digital scan and of the one made during the design step).

Always according to the invention, the method comprises, during or after said step c4), the step of c5) suctioning said diffusion liquid. This allows to keep both the mechanical component to be checked and the base on which the mechanical component is fixed cleaned.

Finally, the method comprises, after said step c), the step of e) checking if said thickness value measured during said step c) of the method corresponds to the nominal thickness value of the design, if said thickness value differs from said nominal thickness value, then said at least one mechanical component to be checked and/or all the mechanical components of the same production batch as the one to be checked is/are withdrawn from production.

BRIEF DESCRIPTION OF THE FIGURES

These and other aspects of the present invention will become clearer in the following detailed description of a preferred embodiment provided herein, by way of example only and without limitations, with reference to the accompanying figures, in which.

DETAILED DESCRIPTION OF A PREFERRED EMBODIMENT OF THE PRESENT INVENTION

With reference to the figures above, a system 100 for checking the presence of thickness restrictions on at least one mechanical component 1 according to the invention is depicted.

As shown in FIG. 1, the system 100 for checking the presence of thickness restrictions on at least one mechanical component 1 such as, for example, a suspension arm of a car, comprises a base 2 for fixing the mechanical component 1 coming from a production line 200 to three fixing points L1, L2, L3, and measuring means 3 to measure the thickness of the mechanical component 1 at a control point P of the mechanical component to be checked. It should be noted that the number of fixing points and that of the control points can also vary with respect to the embodiment described herein, without thereby departing from the protection scope of the present invention.

Figure 1A:
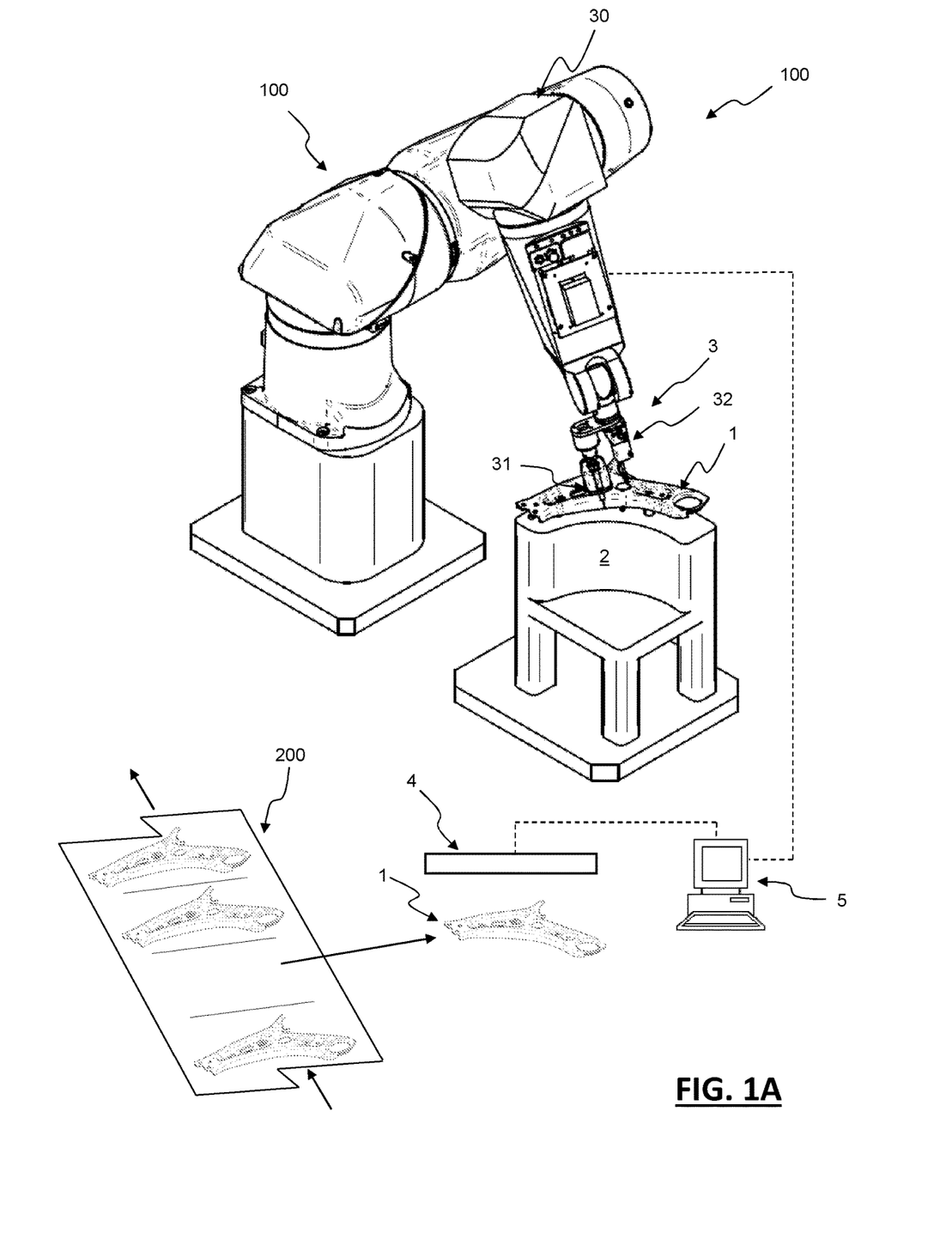
FIG. 1A shows a schematic view of the system according to the invention.

The locking of the mechanical component 1 at the base 2 can be carried out through appropriate vises 80 or other similar means, without thereby departing from the protection scope of the present invention.

Figure 1B:
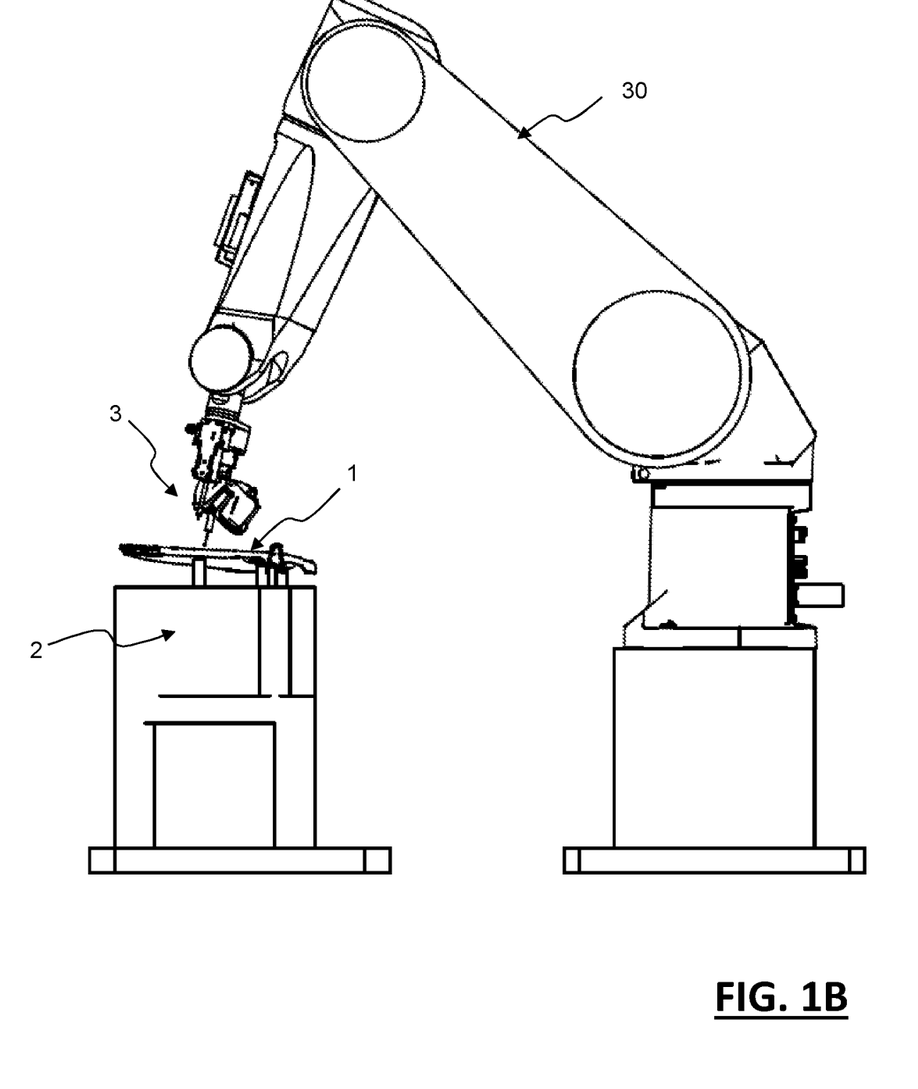
FIG. 1B shows a side view of the robotic arm present in the system of FIG. 1.
Figure 1C:
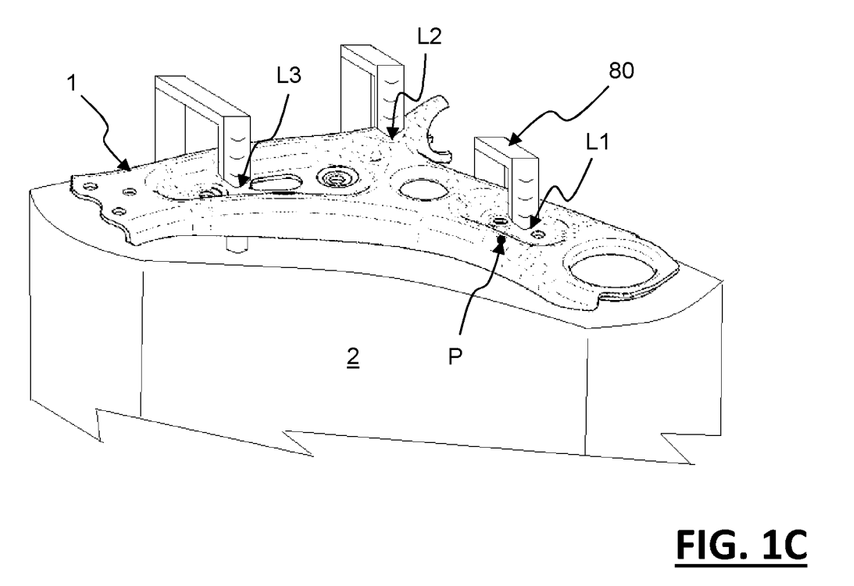
FIG. 1C shows an axonometric view of the mechanical component fixed to the base before being subjected to checking.
Figure 1D:
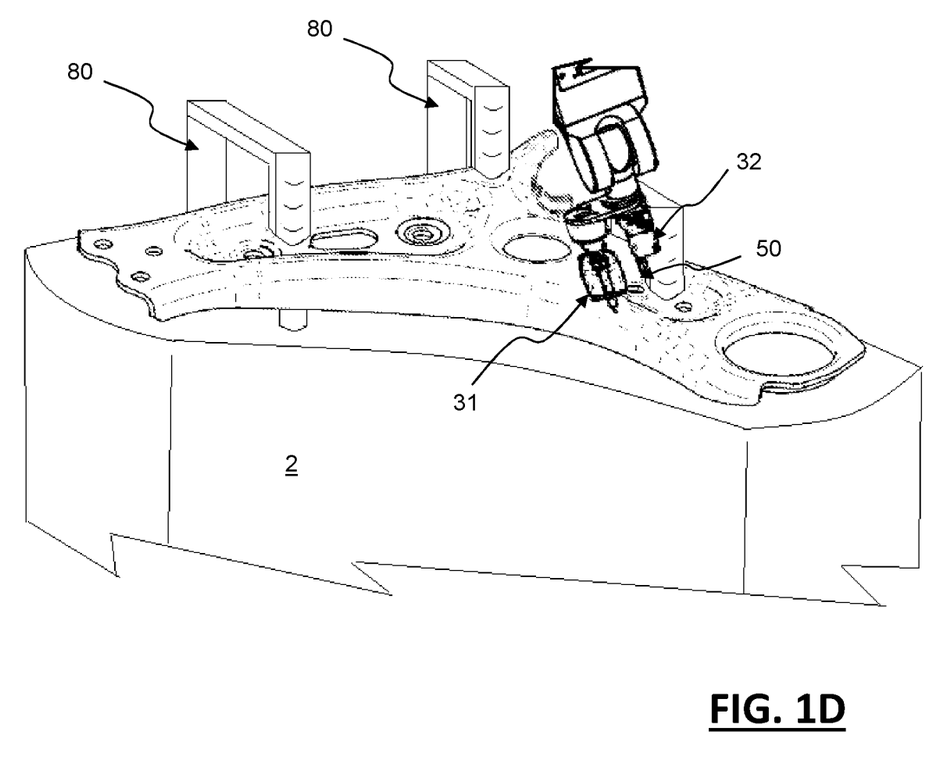
FIG. 1D shows an axonometric view of the mechanical component fixed to the base during the steps of the method object of the invention.

Such measuring means 3 comprise a mechanical robotic arm 30 adapted to be moved in the direction of the control point P. The mechanical robotic arm 30, able to move and rotate on three axes in space, comprises an ultrasonic probe 31 positionable in the proximity of the control point P so that the ultrasonic wave emitted by the ultrasonic probe 31 travels along a direction Q substantially orthogonal to the plane T tangent to the surface S of the mechanical component 1 at the control point P to be checked (see FIG. 2 in particular).

Always according to the invention, the system 100 comprises a digital scanning laser 4 to detect the three-dimensional solid model 300 of the mechanical component 1 to be checked. The mechanical component 1 is picked up from the production line 200 and is displaced next to the laser device for digital scans 4 to detect the solid model 300 of the mechanical component 1 picked up.

It should be noted that in other embodiments of the invention, such digital laser 4 is absent, so the three-dimensional solid model 300 of the mechanical component 1 is made during the design step. Clearly, in this case, the three-dimensional solid model 300 made during the design step will not be perfectly identical to the mechanical component being analyzed by the system 100 object of the invention.

Figure 3A:
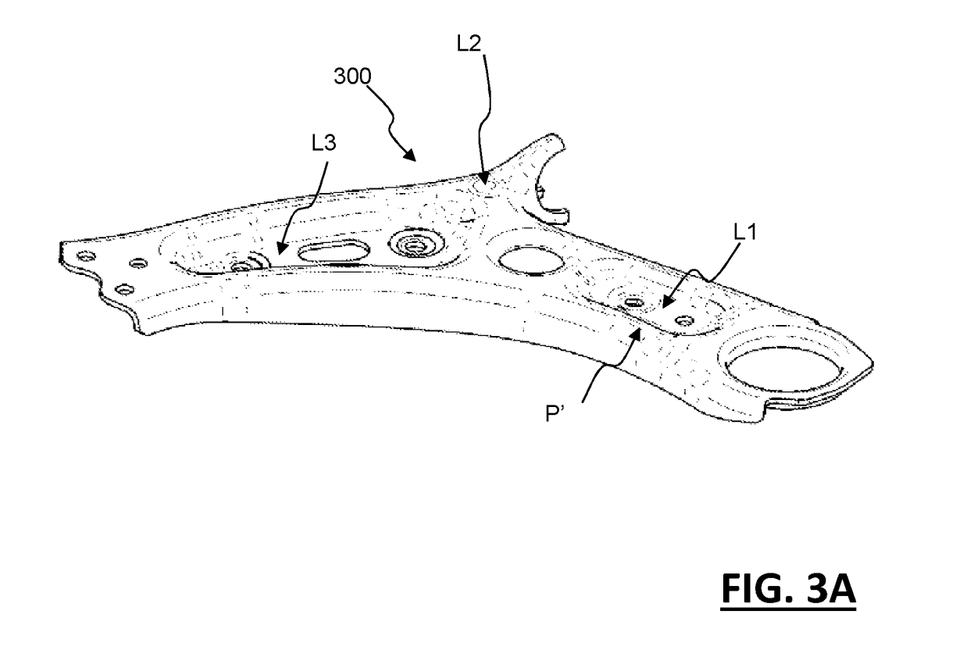
FIG. 3A shows an axonometric view of the three-dimensional solid model of the mechanical component subjected to checking.
Figure 3B:
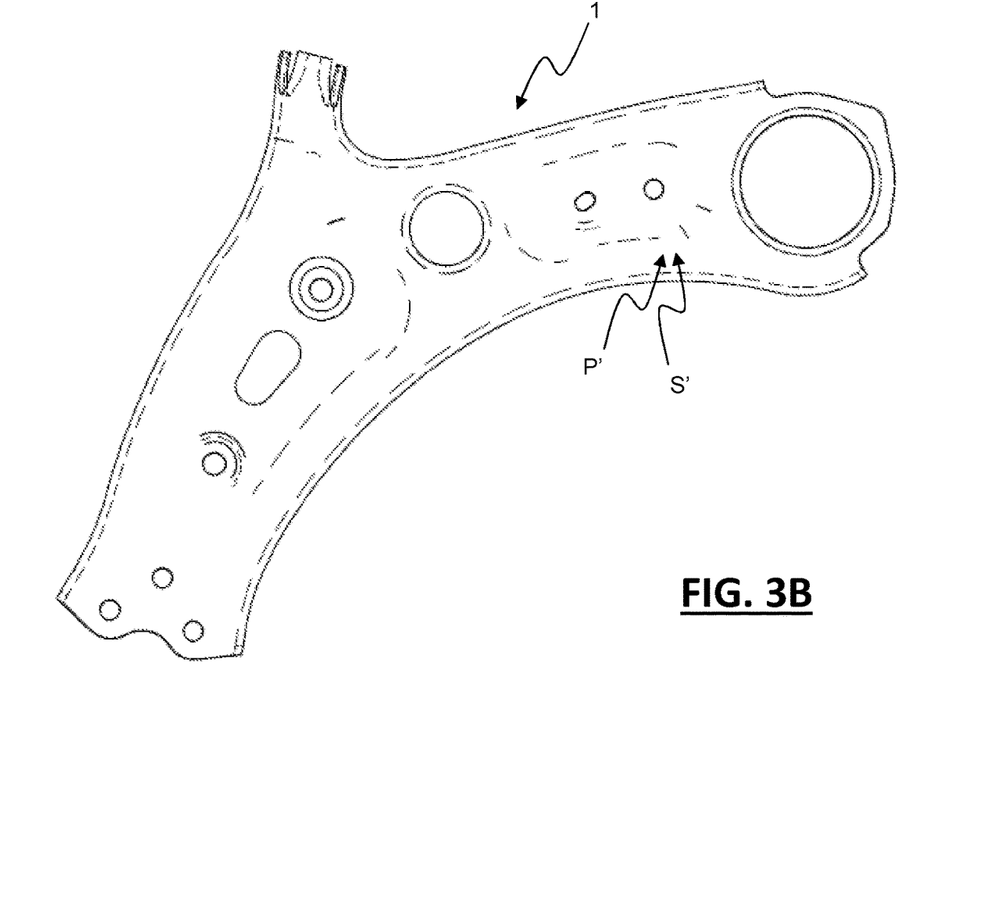
FIG. 3B shows a top view of the three-dimensional solid model shown in FIG. 3A.
Figure 3C:
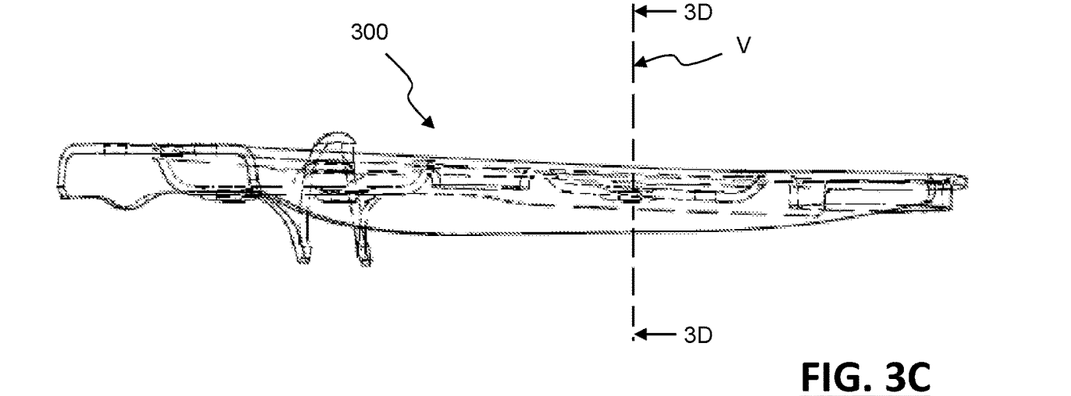
FIG. 3C shows a side view of the solid model shown in FIG. 3A.
Figure 3D:
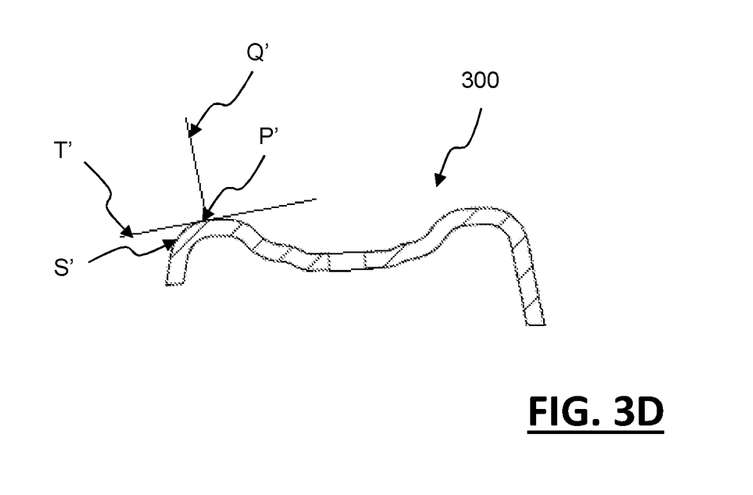
FIG. 3D shows a cross-sectional view of the three-dimensional solid model at the digital control point.

Moreover, the system 100 comprises a processor 5 to calculate the plane T' tangent to the surface S' of the three-dimensional solid model 300 of the mechanical component 1, at a predefined digital control point P' of the three-dimensional solid model corresponding to the control point P on the mechanical component 1, and the direction Q' orthogonal to the plane T' tangent to the surface S' of the three-dimensional solid model 300 of the mechanical component 1.

It should be observed that the space coordinates of the plurality of fixing points L1, L2, L3 are used as three-dimensional references for the three-dimensional solid model 300 so that the control point P of the mechanical component 1 coincides with the control point P' on the three-dimensional solid model 300. Basically, once the solid model 300 has been obtained, for example in a "stl" format or the like, and after having been perfectly oriented according to the space coordinates of the three points of reference L1, L2 and L3, it is possible to easily locate the coordinates of the digital control point P' on the solid digital model 300 so that it corresponds to and allows to precisely locate the control point P selected on the real mechanical component 1.

Figure 2:
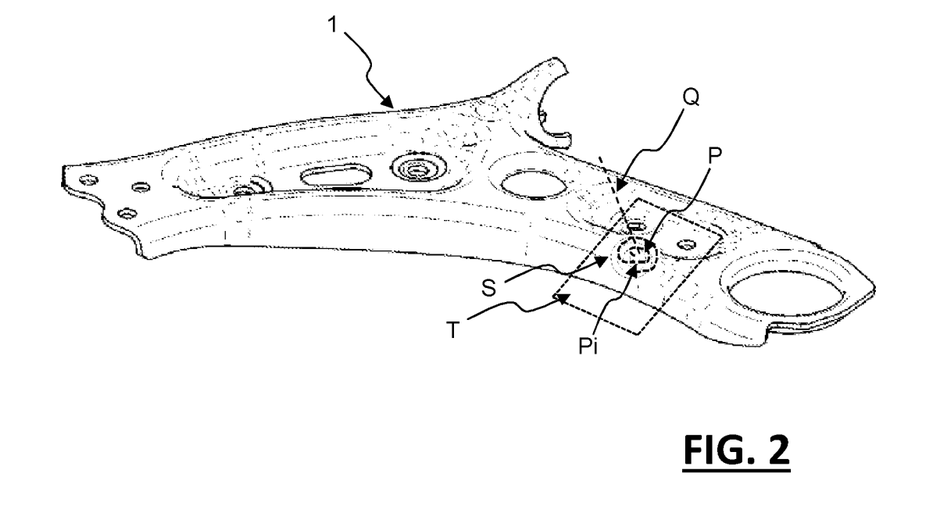
FIG. 2 shows an axonometric view of the mechanical component subjected to checking.

The mechanical arm 30 is moved on the basis of the information obtained from the processor 5, so that the direction Q substantially orthogonal to the plane T tangent to the surface S of the mechanical component 1 along which the ultrasonic wave emitted by the ultrasonic probe 31 travels, at the point P to be checked, coincides with the direction Q' orthogonal to the plane T' tangent to the surface S' of the three-dimensional solid model 300 of the mechanical component 1, at the digital control point P' of the three-dimensional solid model 300.

According to the embodiment described herein, the robotic arm 30 further comprises spraying means 32 to spray, in the proximity of the control point P, a liquid for the diffusion of the ultrasonic wave emitted by the ultrasonic probe 31. Preferably, the liquid for the diffusion of said ultrasonic wave comprises glycerin.

Although not shown in the accompanying figures, the system 100 further comprises suctioning means to suction the liquid so that to favor the diffusion of the ultrasonic wave in the medium. Advantageously, said suctioning means are arranged on the robotic arm 30 such as to always stay integral with and in the proximity of the spraying means 32 for spraying the diffusion liquid. In other embodiments, the suctioning means are arranged in the proximity of the control point P to be checked.

In a further embodiment not described herein, the processor 5 is integrated into said mechanical robotic arm 30.

As shown in the accompanying figures, the robotic arm 30 further comprises a mechanical touch-probe 50 able to detect the space coordinates of the generic point Pi of the mechanical component 1 touched by the touch probe 50. Such mechanical touch-probe 50 follows a trajectory, preferably, but not limitedly in a spiral, in the surrounding space of the control point P to detect the three-dimensional surface of the surrounding space of the control point P itself. The three-dimensional surface of the surrounding space is then compared to the surface of the solid model 300 at the digital control point P' so as to locate the exact space coordinates of the control point P. In fact, the surface of the surrounding space obtained with the touch probe 50 is superimposed on that of the solid model 300 so that to determine the exact space coordinates of the control point P, starting from the coordinates of the digital control point P' of the three-dimensional solid model 300.

The system 100 operates according to the method for checking the presence of thickness restrictions on the mechanical component 1 obtained by molding described here below. Such method comprises the steps of:

a) picking up the mechanical component 1 from the production line 200;

b) fixing the mechanical component 1 to a base 2 in three fixing points L1, L2, L3;

c) measuring the thickness of the mechanical component 1 at the control point P of the mechanical component 1 to be checked;

advantageously, the step c) comprises the step of c1) moving a mechanical robotic arm 30 in the direction of the control point P, wherein the mechanical robotic arm comprises an ultrasonic probe 31 for measuring the thickness of the mechanical component 1 at the control point P, and the step of c2) positioning the ultrasonic probe 31 in the proximity of the control point P so that the ultrasonic wave emitted by the probe 31 travels along a direction Q substantially orthogonal to the plane T tangent to the surface S of the mechanical component 1 at the control point P to be checked, and the step of c3) detecting the thickness of the mechanical component 1 at the control point P.

According to a peculiar aspect of the invention, the method comprises the step of d1) prearranging the three-dimensional solid model 300 of the mechanical component 1, the step of d2) using, as three-dimensional references for the three-dimensional solid model 300, the space coordinates of the plurality of fixing points L1, L2, L3 so that the control point P of the mechanical component 1 coincides with a predefined digital control point P' of the three-dimensional solid model 300, the step of d3) calculating the plane T' tangent to the surface S' of the three-dimensional solid model 300 of the mechanical component 1 at the digital control point P' on the three-dimensional solid model 300, and the step of d4) calculating the direction Q' orthogonal to the plane T' tangent to the surface S' of the three-dimensional solid model 300 of said mechanical component 1. The step c2) is carried out by the mechanical arm 30 on the basis of the information obtained during the steps d1) to d4) so that the direction Q substantially orthogonal to the plane T tangent to the surface S of the mechanical component 1, at the control point P, coincides with said direction Q' orthogonal to said plane T' tangent to the surface S' of the three-dimensional solid model 300 of the mechanical component 1, at the digital control point P' on the three-dimensional solid model 300. In particular, the three-dimensional solid model 300 obtained during the step d1) is generated by a three-dimensional laser device 4 for digital scans. In other embodiments, such three-dimensional solid model 300 is made during the design step. Moreover, the method further comprises the step of c4) spraying a liquid for the diffusion of the ultrasonic wave at the control point P of the mechanical component 1 during the step c3) of the method. In particular, such step c4) is carried out when the robotic arm 30 further comprises spraying means 32 to spray the aforesaid liquid for the diffusion of the ultrasonic wave emitted by the ultrasonic probe 31.

Always according to the invention, the step c1) comprises the step of c1') causing a mechanical touch-probe 50 integral with the mechanical arm 30 to follow a trajectory in the space surrounding the control point P, following a substantially spiral path, to detect the three-dimensional surface of the space surrounding the control point P itself, the step of c1") comparing the three-dimensional surface of the surrounding space detected by the mechanical touch-probe 50 to the surface of the three-dimensional solid model 300 at the digital control point P', and the step of c1''') locating the exact space coordinates of the control point P.

The steps c1'), c1") and c1''') are carried out when the robotic arm 30 comprises a mechanical touch-probe 50 able to detect the space coordinates of the generic point Pi of the mechanical component 1 touched by the touch probe 50.

Always according to the invention, the method comprises, during or after said step c4), the step of c5) suctioning the diffusion liquid.

Finally, the method comprises, after the step c), the step of e) checking if the thickness value measured during the step c) of the method corresponds to the nominal thickness value of the design; if the measured thickness value differs beyond a predefined tolerance from the nominal thickness value, then the mechanical component 1 to be checked and/or all the mechanical components of the same production batch as the one to be checked is/are withdrawn from production.

The invention claimed is:

1. System (100) for checking the presence of thickness restrictions on at least one mechanical component (1), comprising at least one base (2) for fixing said mechanical component (1) coming from a production line (200) to a plurality of fixing points (L1, L2, L3), and measuring means (3) to measure the thickness of said mechanical component (1) next to at least one control point (P) of said mechanical component (1) to be checked, wherein said measuring means (3) comprise at least one mechanical robotic arm (30) adapted to be moved in the direction of said at least one control point (P), wherein said mechanical robotic arm comprises at least one ultrasonic probe (31) for the ultrasonic measurement of the thickness of said mechanical component (1) next to said at least one control point (P), said ultrasonic probe (31) being positionable in the proximity of said at least one control point (P) so that the ultrasonic wave emitted by said ultrasonic probe (31) travels along a direction (Q) substantially orthogonal to the plane (T) tangent to the surface (S) of said mechanical component (1) next to said at least one control point (P) to be checked, characterized by comprising at least one processor (5) to calculate the plane (T') tangent to the surface (S') of the three-dimensional solid model (300) of said mechanical component (1), at a digital control point (P') of said three-dimensional solid model (300) corresponding to the control point (P) on said mechanical component (1), and to calculate the direction (Q') orthogonal to said plane (T') tangent to the surface (S') of said three-dimensional model (300) of said mechanical component (1), wherein the space coordinates of said plurality of fixing points (L1, L2, L3) are used as references for said three-dimensional solid model (300) so that said control point (P) of said mechanical component coincides with said digital control point (P') of said three-dimensional solid model, said mechanical arm (30) being moved on the basis of the information obtained from said processor so that said direction (Q) substantially orthogonal to said plane (T) tangent to the surface (S) of said mechanical component (1) along which said ultrasonic wave emitted by said ultrasonic probe (31) travels, next to said at least one control point (P) to be checked, coincides with said direction (Q') orthogonal to said plane (T') tangent to the surface (S') of said three-dimensional solid model (300) of said mechanical component (1), at said digital control point (P') on said three-dimensional solid model (300).

2. System according to claim 1, further comprising a digital scanning laser (4) to detect the three-dimensional solid model of said mechanical component (1) to be checked.

3. System according to claim 1, wherein said solid model of said mechanical piece (1) is made during the design step.

4. System according to claim 1, wherein said robotic arm (30) further comprises spraying means (32) to spray, in the proximity of said control point (P), a liquid for the diffusion of the ultrasonic wave emitted by said ultrasonic probe (31).

5. System according to claim 4, wherein said liquid for the diffusion of said ultrasonic wave comprises glycerin.

6. System according to claim 5, wherein said processor (5) is integrated into said mechanical robotic arm (30).

7. System according to claim 5, further comprising suctioning means to suction said diffusion liquid.

8. System according to claim 1, wherein said robotic arm comprises at least one mechanical touch-probe (50) able to detect the space coordinates of the generic point (Pi) of said mechanical component (1) touched by said touch probe, said mechanical touch-probe (1) following a trajectory in the space surrounding said at least one control point (P) to detect the three-dimensional surface of said surrounding space, said three-dimensional surface of said surrounding space being compared to the surface of said solid model (300) at said digital control point (P'), so as to locate the exact space coordinates of said control point (P).

9. Method for checking the presence of thickness restrictions on at least one mechanical component (1) obtained by molding, the method comprising the steps of:
 a) picking up said mechanical component (1) from a production line (200);
 b) fixing said mechanical component (1) to a base (2) in a plurality of fixing points (L1, L2, L3);
 c) measuring the thickness of said mechanical component (1) next to at least one control point (P) of said mechanical component to be checked;
 wherein said step c) comprises the step of c1) moving at least one mechanical robotic arm (30) in the direction of said at least one control point (P), wherein said mechanical robotic arm (30) comprises at least one ultrasonic probe (31) for measuring the thickness of said mechanical component next to said at least one control point (P), and the step of c2) positioning said ultrasonic probe in the proximity of said at least one control point (P) so that the ultrasonic wave emitted by said ultrasonic probe (31) travels along a direction (Q) substantially orthogonal to the plane (T) tangent to the surface (S) of said mechanical component (1) next to said at least one control point (P), and the step of c3) detecting the thickness of said at least one mechanical component at said control point (P), characterized in that said method comprises the step of d1) prearranging the three-dimensional solid model (300) of said mechanical component (1), the step of d2) using, as three-dimensional references for said solid model (300), the space coordinates of said plurality of fixing points (L1, L2, L3) so that said control point (P) of said mechanical component coincides with a digital control point (P') of said three-dimensional solid model, the step of d3) calculating the plane (T') tangent to the surface (S') of said three-dimensional solid model (300) of said mechanical component (1) next to said digital control point (P') on said three-dimensional solid model (300), and the step of d4) calculating the direction (Q') orthogonal to said plane (T') tangent to the surface (S') of said three-dimensional solid model (200) of said mechanical component (1), said step c2) being carried out by said mechanical arm on the basis of the information obtained during said steps d1) to d4) so that said direction (Q) substantially orthogonal to said plane (T) tangent to the surface (S) of said mechanical component (1), next to said at least one control point (P), coincides with said direction (Q') orthogonal to said plane (T') tangent to the surface (S') of said three-dimensional solid model (300) of said mechanical component (1), at said digital control point (P') on said three-dimensional solid model (300).

10. Method according to claim 9, wherein said three-dimensional solid model (300) is generated by a three-dimensional laser device (4) for digital scans or is made in the design step of said mechanical component.

11. Method according to claim 9, wherein said robotic arm (30) further comprises spraying means (32) to spray a liquid for the diffusion of the ultrasonic wave emitted by said ultrasonic probe (31), said method comprising the step of c4) spraying said liquid at said control point (P) of said mechanical component (1) during at least said step c3) of the method.

12. Method according to claim 9, wherein said robotic arm comprises a mechanical touch-probe (50) able to detect the space coordinates of the generic point (Pi) of said mechanical component (1) touched by said touch probe, characterized in that said step c1) comprises the step of c1') causing said mechanical touch probe (50) to follow a trajectory in the space surrounding said at least one control point (P) to detect the three-dimensional surface of said surrounding space, the step of c1") comparing said three-dimensional surface of said surrounding space detected by said mechanical touch-probe to the surface of said three-dimensional solid model (300) at said digital control point (P'), and the step of c1''') locating the exact space coordinates of said control point (P).

13. Method according to claim 11, further comprising, during or after said step c4), the step of c5) suctioning said diffusion liquid.

14. Method according to claim 9, further comprising, after said step c), the step of e) checking whether said thickness value measured during said step c) of the method corresponds to the nominal thickness value of the design, if said measured thickness value differs from said nominal thickness value beyond a predetermined tolerance then said at least one mechanical component to be checked and/or all mechanical components of the same production batch as the one to be checked is/are withdrawn from production.

* * * * *